United States Patent
Zhang (10) Patent No.: US 11,514,296 B2
(45) Date of Patent: Nov. 29, 2022

(54) OUTPUT METHOD AND APPARATUS FOR MULTIPLE NEURAL NETWORK, SERVER AND COMPUTER READABLE STORAGE MEDIUM

(71) Applicant: BAIDU ONLINE NETWORK TECHNOLOGY (BEIJING) CO., LTD., Beijing (CN)

(72) Inventor: Yang Zhang, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 433 days.

(21) Appl. No.: 16/728,644

(22) Filed: Dec. 27, 2019

(65) Prior Publication Data
US 2020/0210815 A1  Jul. 2, 2020

(30) Foreign Application Priority Data

Dec. 29, 2018  (CN) .......................... 201811639019.5

(51) Int. Cl.
*G06N 3/04*  (2006.01)
*G05D 1/02*  (2020.01)
*G06N 3/08*  (2006.01)
*G06V 20/56* (2022.01)

(52) U.S. Cl.
CPC ......... *G06N 3/0454* (2013.01); *G05D 1/0246* (2013.01); *G06N 3/08* (2013.01); *G06V 20/56* (2022.01)

(58) Field of Classification Search
USPC ............................................ 706/23; 382/158
See application file for complete search history.

(56) References Cited

U.S. PATENT DOCUMENTS

| | | | | |
|---|---|---|---|---|
| 10,664,963 B1 * | 5/2020 | Rossi | ...................... | G06V 10/82 |
| 10,713,754 B1 * | 7/2020 | Wang | ...................... | G06T 11/60 |
| 2012/0303932 A1 | 11/2012 | Farabet | | |
| 2018/0300601 A1 * | 10/2018 | Cedola | ................ | G06F 13/1689 |

(Continued)

FOREIGN PATENT DOCUMENTS

| | | | | |
|---|---|---|---|---|
| CN | 107977706 A | | 5/2018 | |
| CN | 108475347 A | * | 8/2018 | ........... G06N 3/0454 |
| CN | 108475347 A | | 8/2018 | |

(Continued)

OTHER PUBLICATIONS

Office Action for Chinese Application No. 201811639019.5, dated Jul. 3, 2020, 11 pages.

(Continued)

*Primary Examiner* — Behrooz M Senfi
(74) *Attorney, Agent, or Firm* — Fay Sharpe LLP (57) ABSTRACT

The present disclosure provides an output method for multiple neural networks. The method includes dividing an operator operation process for each of the neural networks or operator operation processes for part of the neural networks into multiple times of executions according to a preset ratio of output frame rates among the multiple neural networks; and executing the operator operation processes for the multiple neural networks sequentially by switching among the networks, such that the multiple neural networks output uniformly and satisfy the preset ratio of output frame rates.

12 Claims, 3 Drawing Sheets

(56) References Cited

U.S. PATENT DOCUMENTS

2018/0350069 A1* 12/2018 Nakano ................ G06N 3/0454
2021/0232923 A1* 7/2021 Nakai .................. G06N 3/0454

FOREIGN PATENT DOCUMENTS

| CN | 109002358 A | 12/2018 |
| CN | 110516703 A | 11/2019 |
| KR | 20160138892 A | 12/2016 |

OTHER PUBLICATIONS

Extended European Search Report for Application No. 19220024.4, dated May 15, 2020, 9 pages.
Venieris, et al. "Toolflows for Mapping Convolutional Neural Networks on FPGAs: A Survey and Future Directions", ACM Computing Surveys, vol. 0, No. 0, Article 0., dated Mar. 2018.

* cited by examiner

OUTPUT METHOD AND APPARATUS FOR MULTIPLE NEURAL NETWORK, SERVER AND COMPUTER READABLE STORAGE MEDIUM

CROSS REFERENCE TO RELATED APPLICATION

This application claims priority under 35 U.S.C. § 119(a) on Chinese Patent Application No. 201811639019.5, filed with the State Intellectual Property Office of P. R. China on Dec. 29, 2018, the entire contents of which are incorporated herein by reference.

TECHNICAL FIELD

Embodiments of the present disclosure mainly relate to a field of automatic control, and more particularly to an output method and an output apparatus for multiple neural networks, a server, and a computer readable storage medium.

BACKGROUND

During automatic driving, devices in an automatic driving terminal may face processing tasks of multiple neural networks at the same time. For example, images are collected respectively by a front-view camera and a side-view camera and classified respectively by the front-view camera and the side-view camera, and an image classification result of the front-view camera and an image classification result of the side-view camera are uniformly outputted in unit time. When there are a finite number of acceleration processing units of the neural network for processing the processing tasks of the multiple neural networks, the finite number of the acceleration processing units of the neural network may not enable processing results of multiple tasks of which an output frame rate satisfies a preset ratio of output frame rates to output uniformly. For example, if a ratio of output frame rates of neural network A and neural network B needs to satisfy a preset ratio of output frame rates which is 3:1, when the output is A, A, A, B, A, A, A, B, A, A, A, B, . . . , the output of a processing result of tasks of the neural network A and the output of a processing result of tasks of the neural network task B are not uniform.

It should be noted that, the introduction in the Background above only aims to facilitate a clear and complete illustration of the technical solutions of the present disclosure and to facilitate the understanding and exposition of those skilled in the art, which cannot be explained that the above technical solutions are well known to those skilled in the art only because the technical solutions are described in the Background of the present disclosure.

SUMMARY

Embodiments of the present disclosure provide an output method and an output apparatus for multiple neural networks, a server, and a computer readable storage medium.

In a first aspect, embodiments of the present disclosure provide an output method for multiple neural networks. The method includes: dividing an operator operation process for each of the neural networks or operator operation processes for part of the neural networks into multiple times of executions according to a preset ratio of output frame rates among the multiple neural networks; and executing the operator operation processes for the multiple neural networks sequentially by switching among the networks, such that the multiple neural networks output uniformly and satisfy the preset ratio of output frame rates.

In a second aspect, embodiments of the present disclosure provide an output apparatus for multiple neural networks. The apparatus includes: one or more processors, and a storage apparatus, configured to store one or more programs, wherein, when the one or more programs are executed by the one or more processors, the one or more processors are configured to implement an output method for multiple neural networks, comprising: dividing an operator operation process for each of the neural networks or operator operation processes for part of the neural networks into multiple times of executions according to a preset ratio of output frame rates among the multiple neural networks; and executing the operator operation processes for the multiple neural networks sequentially by switching among the networks, such that the multiple neural networks output uniformly and satisfy the preset ratio of output frame rates.

In a third aspect, embodiments of the present disclosure provide a computer readable storage medium having a computer program stored thereon. When the computer program is executed, the program implements the output method for multiple neural networks, comprising dividing an operator operation process for each of the neural networks or operator operation processes for part of the neural networks into multiple times of executions according to a preset ratio of output frame rates among the multiple neural networks; and executing the operator operation processes for the multiple neural networks sequentially by switching among the networks, such that the multiple neural networks output uniformly and satisfy the preset ratio of output frame rates.

With the output method for multiple neural networks provided in embodiments of the present disclosure, the operator operation process for each of the neural networks or the operator operation processes for part of the neural networks are divided into the multiple times of executions according to the preset ratio of output frame rates among the multiple neural networks; and the operator operation processes for the multiple neural networks sequentially are executed by switching among the networks, such that the multiple neural networks output uniformly and satisfy the preset ratio of output frame rates. In this way, the multiple neural networks with the preset ratio of output frame rates may output uniformly.

BRIEF DESCRIPTION OF THE DRAWINGS

The accompanying drawings are intended to provide a further understanding for embodiments of the present disclosure and to form a part of the specification, and are used together with embodiments of the present disclosure to explain the present disclosure, which do not constitute a limitation on the present disclosure. By referring to the accompanying drawings to describe detailed exemplary embodiments, the above and other features and advantages will become more obvious to the skilled in the art. In the accompanying drawings.

DETAILED DESCRIPTION

In order to enable the skilled in the art to better understand the technical solution of the present disclosure, detailed description will be made to an output method and an output apparatus for multiple neural networks, a server, and a computer readable storage medium with reference to the accompanying drawings.

Exemplary embodiments will be described more fully hereinafter with reference to the accompanying drawings. However, the exemplary embodiments may be embodied in different forms and should not be construed as being limited to the embodiments described herein. On the contrary, the objective for providing these embodiments is to enable the present disclosure thorough and complete, and to enable those skilled in the art to fully understand the scope of the present disclosure.

Terms used herein are only for the purpose of describing specific embodiments, but should not be construed to limit the present disclosure. As used in the present disclosure, "a" and "the" in singular forms mean including plural forms, unless clearly indicated in the context otherwise. It should be further understood that, when used in the specification, terms "including" and/or "containing" specify the presence of stated features, an entirety, steps, operations, elements and/or components, but do not exclude the presence or addition of one or more other features, an entirety, steps, operations, elements, components and/or groups thereof.

Unless specified or limited otherwise, all terms (including technical and scientific terms) used herein have the same meaning as commonly understood by the skilled in the art. It will be understood that, terms such as those defined in commonly used dictionaries should be interpreted as having meanings consistent with their meanings in the context of the related art and background of the present disclosure, and will not be construed as having an idealized or excessively formal meaning unless explicitly limited herein.

Figure 1:
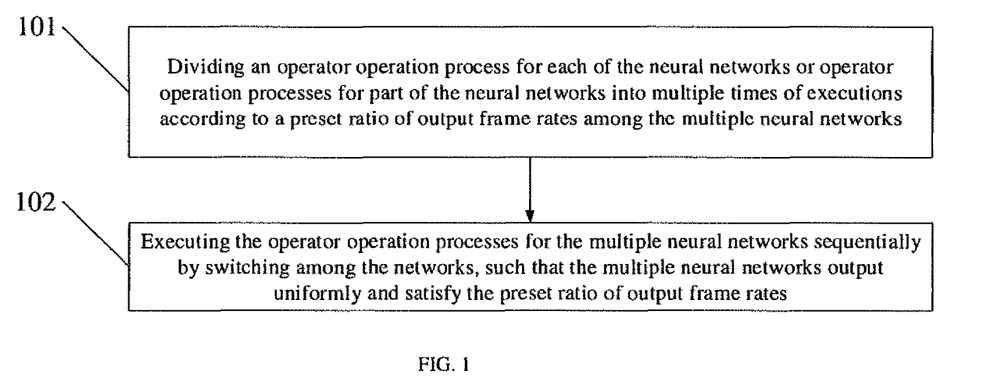
FIG. 1 is a flow chart illustrating an output method for multiple neural networks according to embodiments of the present disclosure.

FIG. 1 is a flow chart illustrating an output method for multiple neural networks according to embodiments of the present disclosure. As illustrated in FIG. 1, the method may be executed by an output apparatus for multiple neural networks. The apparatus may be implemented in form of software and/or hardware. The apparatus may be integrated in a server. The method includes actions at following blocks.

At block 101, an operator operation process for each of the neural networks or operator operation processes for part of the neural networks are divided into multiple times of executions according to a preset ratio of output frame rates among the multiple neural networks.

For example, when a preset ratio of output frame rates among three neural networks A, B and C is 3:1:1, an operator operation process for the neural network B is divided into three times of execution. In each time of execution of the operator operation process for the neural network B, operations for ⅓ of all operators in the neural network B are completed. An operator operation process for the neural network C is divided into three times of executions. In each time of execution of the operator operation process for the neural network C, operations for ⅓ of all operators in the neural network C are completed. Here, it is not necessary to divide the operator operation process for the neural network A. In the execution of the operator operation process for the neural network A, operations for all operators in the neural network A are completed.

At block 102, the operator operation processes for the multiple neural networks are executed sequentially by switching among the networks, such that the multiple neural networks output uniformly and satisfy the preset ratio of output frame rates.

For example, the operator operation processes for the neural networks A, B and C are executed sequentially by switching among the neural networks A, B and C, with the outputs A, ⅓B, ⅓C, A, ⅔B, ⅔C, A, B, C . . . . The neural networks A, B and C output uniformly and satisfy the preset ratio of output frame rates 3:1:1.

Alternatively, when the operations for all operators in the multiple neural networks have been completed, output data of the multiple neural networks are taken for subsequent processing or usage.

With the output method for multiple neural networks according to this embodiment, an operator operation process for each of the neural networks or operator operation processes for part of the neural networks may be divided into multiple times of executions according to a preset ratio of output frame rates among any number of neural networks, to implement uniform output for any number of neural networks.

Figure 2:
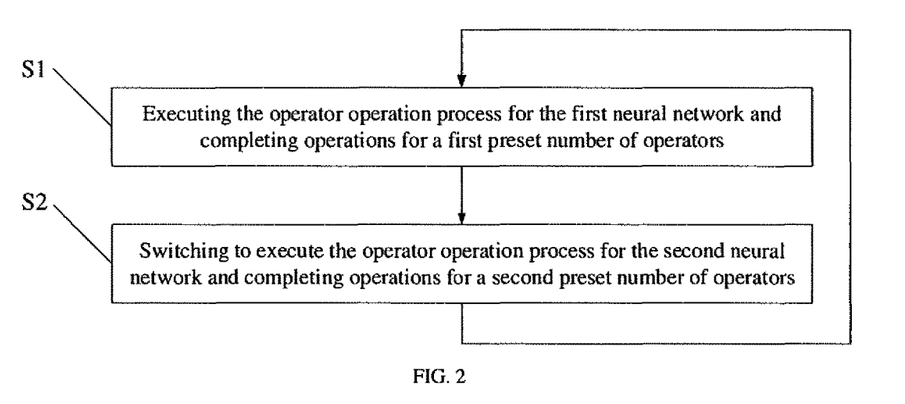
FIG. 2 is a flow chart illustrating an output method for two neural networks according to embodiments of the present disclosure.

FIG. 2 is a flow chart illustrating an output method for two neural networks according to embodiments of the present disclosure. The two neural networks are respectively a first neural network and a second neural network. An operator operation process for the first neural network and/or the second neural network may be divided into multiple times of executions according to a preset ratio of output frame rates between the first neural network and the second neural network. As illustrated in FIG. 2, the method includes actions at following blocks.

At block S1, the operator operation process for the first neural network is executed, and operations for a first preset number of operators are completed.

At block S2, the execution is switched to the operator operation process for the second neural network, and operations for a second preset number of operators are completed, and then proceeds to the action at block S1.

There is a preset ratio of output frame rates between the first neural network and the second neural network. The operator operation process for the first neural network and/or the operator operation process for the second neural network are/is divided into multiple times of executions according to the preset ratio of output frame rates between the first neural network and the second neural network. Further, a first number of operators for which the operations are required to be completed in the operator operation process for the first neural network in each time and a second number of operators for which the operations are required to be completed in the operator operation process for the second neural network in each time are set. For example, when the preset ratio of output frame rates between the first neural network and the second neural network is 3:1, the operator operation process for the second neural network is divided into three times of execution. The first number is the number of all operators in the first neural network, and the second number is ⅓ number of all operators in the second neural network. When the preset ratio of output frame rates is 5:1, the operator operation process for the second neural network is divided into five times of execution. The first number is the number of all operators in the first neural network, and the second number is ⅓ number of all operators in the second neural network. When the preset ratio of output frame rates is 3:4, the operator operation process for the first neural network is divided into four times of execution, and the operator operation process for the second neural network is divided into three times of execution. The first number is ¼ number of all operators in the first neural network, and the second number is ⅓ number of all operators in the second neural network.

The above design may allow for uniform execution and uniform output of the operator operation process for the first neural network and the operator operation process for the second neural network when the preset ratio of output frame rates is satisfied.

The first neural network and the second neural network may be configured to implement image processing neural network for automatic driving. The preset output frame rate may be generated based on respective automatic driving scenes. For example, during the automatic driving, the first neural network may be configured to classify front-view images collected by front-view sensors to output a classification result of the front-view images. The second neural network may be configured to classify side-view images collected by side-view sensors to output a classification result of the side-view images, an output frame rate of the classification result of the front-view image is greater than an output frame rate of the classification result of the side-view image, and the preset ratio of output frame rates between the first neural network and the second neural network may be 3:1 per unit of time.

The actions at block S1 and S2 are executed in a loop by switching between the networks, such that the operator operation process for the first neural network and the operator operation process for the second neural network are switched to be executed and output uniformly, and the ratio of the output frame rates between the first neural network and the second neural network satisfies the preset ratio of the output frame rates. For example, a result for executing the actions at block S1 and S2 in a loop may be sequentially that, the first neural network outputs A, the second neural network outputs ⅓B, the first neural network outputs A, the second neural network outputs ⅔B, the first neural network outputs A, and the second neural network outputs B. The first neural network and the second neural network output alternatively, enabling to output uniformly, and the ratio of the output frame rates between the first neural network and the second neural network satisfies the preset ratio of the output frame rates 3:1.

During the automatic driving, output data of a first operator in the first neural network may be the front-view image collected by the front-view sensor, and output data of a first operator in the second neural network may be the side-view image collected by the side-view sensor. The output of the first neural network may be the classification result of the front-view image generated by the front-view image collected by the front-view sensor, and the output of the second neural network may be the classification result of the side-view image generated by the side-view image collected by the side-view sensor.

Figure 3:
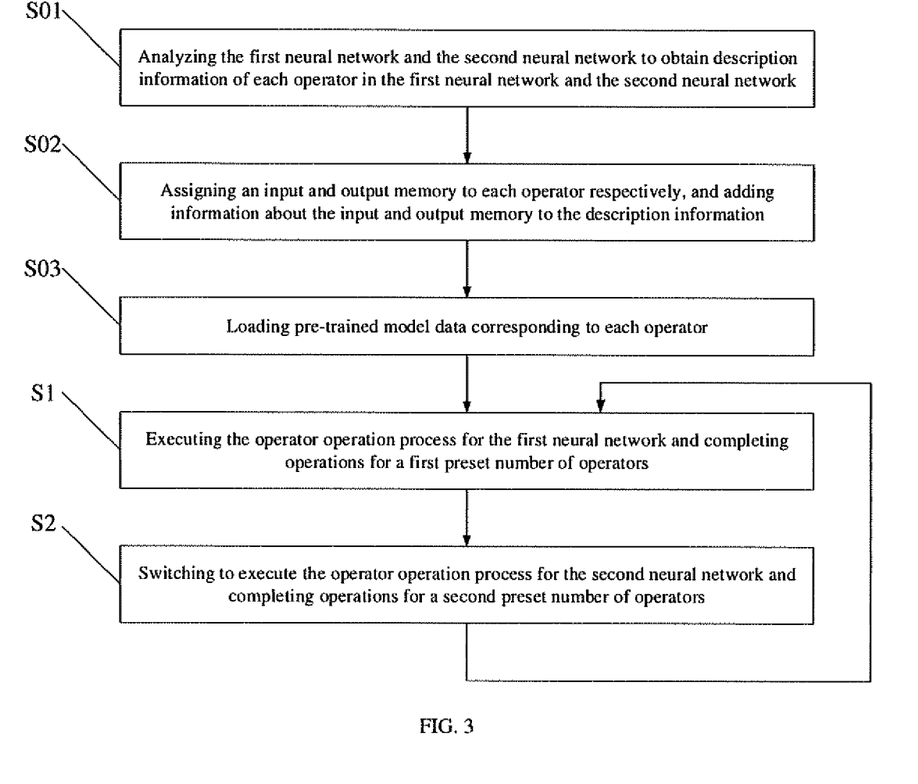
FIG. 3 is a flow chart illustrating an output method for two neural networks provided by another embodiment of the present disclosure.

FIG. 3 is a flow chart illustrating an output method for two neural networks according to another embodiment of the present disclosure. As illustrated in FIG. 3, before the actions at block S1 and S2 are executed, the method further includes actions at following blocks.

At block S01, the first neural network and the second neural network are analyzed to obtain description information of each operator in the first neural network and the second neural network.

The description information of each operator at least includes an input data address, an operator size, an operator type, an operator parameter and an output data address.

At block S02, an input and output memory is assigned to each operator respectively, and information about the input and output memory is added to the description information.

The description information of each operator further includes the information about the input and output memory. In this embodiment, by assigning the input and output memory to each operator in the first neural network and the second neural network, respectively, switching speed between the first neural network and the second neural network during the actions at block S1 and block S2 may be improved. Further, during the switching between the first neural network and the second neural network, it is not necessary to release the memory occupied by the current neural network or to request a memory for a neural network to be switched to, thus improving efficiency for switching among networks.

At block S03, pre-trained model data corresponding to each operator is loaded.

The model data may include weight model data. The model data may be loaded from a hard disk or a secure digital memory card (SD card). The model data corresponding to the operator is used for implementing operations of the operator.

It is noted that there is not necessarily a certain sequential relationship among the above block S01, block S02 and block S03. For example, the actions at block S03 may be executed before the actions at block S01 and block S02, or the actions at block S01, block S02 and block S03 may be executed simultaneously.

Based on the above actions at blocks S01-S03, the operator operation processes at blocks S1 and S2 specifically include: sending the description information of the operator to an acceleration processing unit downstream, such that the acceleration processing unit may execute the operator operation processes according to the description information and the model data.

The acceleration processing unit may be a field-programmable gate array (FPGA) neural network acceleration processing unit. In this embodiment, the operator operation processes for the multiple neural networks are implemented through a single acceleration processing unit. The acceleration processing unit may execute the operator operation processes according to the description information of the operator and the model data corresponding to the operator. During the execution of the operator operation processes, output data stored in an output data address for an operator may be taken as input data stored in an input data address for a next operator. For example, when the operator operation process for the second neural network is executed, in which operations for n operators are completed, output data for the n-th operator is taken as input data for the (n+1)-th operator. When the execution is switched to the operator operation process for the second neural network next time, the description information of the (n+1)-th operator is sent to the acceleration processing unit downstream to continue the operations for the operators in the second neural network. Optionally, the total number N of operators in one neural network may be 100.

With the output method for multiple neural networks according to embodiments of the present disclosure, in a case where the preset ratio of output frame rates among the multiple neural networks is fixed, the operator operation process for at least one neural network may be divided into a plurality of times of execution. Further, by managing computation of the multiple neural networks centrally and controlling ordered switching among the multiple neural networks, the multiple neural networks may output uniformly through a single acceleration processing unit, increase resource utilization, and avoid delay and waiting.

When the output method for multiple neural networks according to embodiments of the present disclosure is applied to image processing in automatic driving in which classification results for respective types of images have to be output quickly, the classification result for images collected from respective angles may be outputted uniformly during the automatic driving, improving user experience during the automatic driving.

It should be noted that, although operations of the method of the present disclosure are described in a specific order in the accompanying drawings, this is not a requirement or implied that the operations must be performed in the specific order, or that all the operations shown must be performed to achieve the desired result. Additionally or alternatively, certain steps may be omitted, multiple steps are combined into one step for executing, and/or one step is broken down into multiple steps for executing.

It should be noted that, in the present disclosure, the technical solution related in the above embodiments may be combined with each other without any contradiction.

Figure 4:
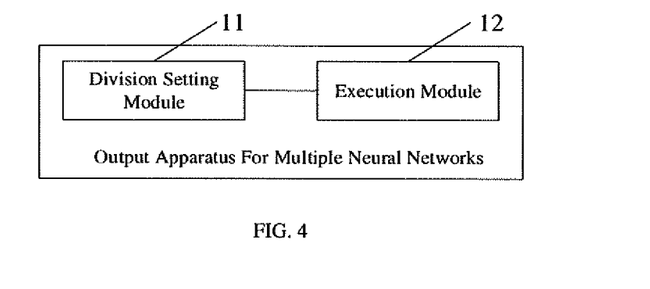
FIG. 4 is a block diagram illustrating an output apparatus for multiple neural networks according to embodiments of the present disclosure.

FIG. 4 is a block diagram illustrating an output apparatus for multiple neural networks according to embodiments of the present disclosure. As illustrated in FIG. 4, the output apparatus for multiple neural networks includes: a division setting module 11 and an execution module 12.

The division setting module 11 is configured to divide an operator operation process for each of the neural networks or operator operation processes for part of the neural networks into multiple times of executions according to a preset ratio of output frame rates among the multiple neural networks, and to set a number of operators completing the operator operation process each time the operator operation process for each neural network is executed. The execution module 12 is configured to execute the operator operation processes for the multiple neural networks sequentially by switching among the networks, such that the multiple neural networks output uniformly and satisfy the preset ratio of output frame rates.

Figure 5:
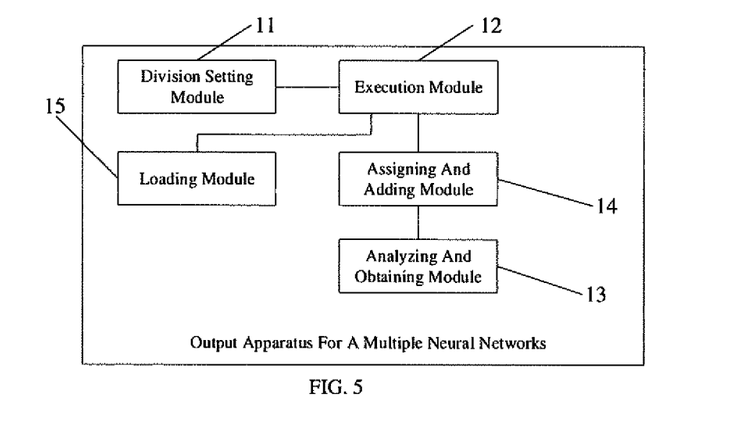
FIG. 5 is a block diagram illustrating an output apparatus for multiple neural networks provided by another embodiment of the present disclosure.

FIG. 5 is a block diagram illustrating an output apparatus for multiple neural networks provided by another embodiment of the present disclosure. As illustrated in FIG. 5, when the multiple neural networks includes a first neural network and a second neural network, the division setting module 11 is configured to divide the operator operation process for the first neural network and/or the operator operation process for the second neural network into multiple times of executions according to a preset ratio of output frame rates between the first neural network and the second neural network, and to set a first number of operators for which the operations are required to be completed in the operator operation process for the first neural network in each time and a second number of operators for which the operations are required to be completed in the operator operation process for the second neural network. The execution module 12 is configured to execute the operator operation process for the first neural network and to complete operations for the first preset number of operators; and to switch to execute the operator operation process for the second neural network and to complete operations for the second preset number of operators.

Further, the apparatus further includes: an analyzing and obtaining module 13, an assigning and adding module 14 and a loading module 15.

The analyzing and obtaining module 13 is configured to analyze the first neural network and the second neural network to obtain description information of each operator in the first neural network and the second neural network. The assigning and adding module 14 is configured to assign an input and output memory to each operator respectively, and to add information about the input and output memory to the description information. The loading module 15 is configured to load pre-trained model data corresponding to each operator.

Further, the description information at least includes an input data address and an output data address, and the execution module 12 is further configured to send the description information of the operator to an acceleration processing unit downstream, such that the acceleration processing unit executes the operator operation process according to the description information and the model data, in which, during the execution of the operator operation process, output data stored in an output data address for an operator is to be taken as input data stored in an input data address for a next operator.

Further, the neural network is an image processing neural network configured to implement autonomous driving.

It should be noted that, in the present disclosure, the technical features related in the respective embodiments above may combine each other without any contradiction.

The output apparatus for multiple neural networks provided in this embodiment may be configured to implement the corresponding output method for multiple neural networks provided in this embodiment.

In addition, the description for implementation details and technical effects of the respective modules above may be referred to the description of the embodiments of the above method, which is not elaborated herein.

Embodiments of the present disclosure further provide a server. The server includes: one or more processors and a storage apparatus. The storage apparatus is configured to store one or more programs. When the one or more programs are executed by the one or more processors, the one or more processors are caused to implement the output method for multiple neural networks provided by respective embodiments described above.

For example, the processor is a center processing unit (CPU).

Embodiments of the present disclosure further provide a computer readable storage medium having a computer program stored thereon. When the computer program is executed, the output method for multiple neural networks provided by respective embodiments described above is implemented.

It should be understood by the skilled in the art that, all or some steps in the method disclosed above and function modules/units in the apparatus disclosed above may be implemented as software, firmware, hardware, and suitable combinations thereof. In a hardware implementation, division for the function modules/units mentioned in the above description may not correspond division for physical components. For example, one physical component may have a plurality of functions, or one function or step may be executed in cooperation with several physical components. Some physical components or all physical components may be implemented as software executed by a processor such as a central processing unit, a digital signal processor, or a microprocessor, implemented as hardware, or implemented as an integrated circuit such as an application specific integrated circuits. Such software may be distributed on a computer readable medium. The computer readable medium may include the computer readable storage medium (or non-transitory medium) and a communication medium (or transitory medium). As known by the skilled in the art, the term computer storage medium includes volatile and non-volatile medium, removable and non-removable medium implemented in any method or technology for storing information (such as computer readable instructions, data structures, program modules or other data). The computer storage medium may include, but not be limited to, a RAM (random access memory), a ROM (read only memory), an erasable programmable read-only memory (EPROM), a flash memory or other memory technology, CD-ROM (compact disc read-only memory), digital versatile disc (DVD) or other optical disc storage, magnetic cartridge, magnetic tape, magnetic disk storage or other magnetic storage device, or may any other medium used to store the desired information and that may be accessed by the computer. In addition, as known by the skilled in the art, a communication medium generally includes computer readable instructions, data structures, program modules, or other data in a modulated data signal such as a carrier wave or other transport mechanism, and may include any information delivery media.

Exemplary embodiments have been disclosed herein, and although specific terms are employed, they are used and are to be interpreted in a generic and descriptive sense only and not for purpose of limitation. In some embodiments, as would be apparent to the skilled in the art as of the filing of the present disclosure, features, characteristics, and/or elements described in connection with a particular embodiment may be used singly or in combination with features, characteristics, and/or elements described in connection with other embodiments unless otherwise specifically indicated. Therefore, the skilled in the art should understood that, various forms and details may be changed without departing from the scope of the present disclosure as set forth in the appended claims.

What is claimed is:

1. An output method for multiple neural networks, comprising:
   dividing an operator operation process for each of the neural networks or operator operation processes for part of the neural networks into multiple times of executions according to a preset ratio of output frame rates among the multiple neural networks; and
   executing the operator operation processes for the multiple neural networks sequentially by switching among the networks, such that the multiple neural networks output uniformly and satisfy the preset ratio of output frame rates;
   wherein when the multiple neural networks comprise a first neural network and a second neural network, the operator operation process for at least one of the first neural network and the second neural network is divided into multiple times of execution according to a preset ratio of output frame rates between the first neural network and the second neural network, a first preset number and a second preset number are set according to a number of operators in the first neural network, a number of operators in the second neural network and the preset ratio, and executing the operator operation processes of the multiple neural networks sequentially by switching among the networks comprises the following steps:
   executing the operator operation process for the first neural network and completing operations for the first preset number of operators;
   switching to execute the operator operation process for the second neural network and completing operations for the second preset number of operators; and
   executing the above two steps in a loop, such that the first neural network and the second neural network output uniformly.

2. The output method of claim 1, before the two steps, further comprising:
   analyzing the first neural network and the second neural network to obtain description information of each operator in the first neural network and the second neural network;
   assigning an input and output memory to each operator respectively, and adding information about the input and output memory to the description information; and
   loading pre-trained model data corresponding to each operator.

3. The output method of claim 2, wherein, the description information at least comprises an input data address and an output data address, and the two steps further comprise:
   sending the description information of the operator to an acceleration processing unit downstream, such that the acceleration processing unit executes the operator operation process according to the description information and the model data,
   wherein, during the execution of the operator operation process, output data stored in an output data address for an operator is to be taken as input data stored in an input data address for a next operator.

4. The output method of claim 1, wherein, the neural network is an image processing neural network configured to implement autonomous driving.

5. An output apparatus for a multiple neural networks, comprising:
   one or more processors, and
   a storage apparatus, configured to store one or more programs,
   wherein, when the one or more programs are executed by the one or more processors, the one or more processors are configured to implement an output method for multiple neural networks, comprising:
   dividing an operator operation process for each of the neural networks or operator operation processes for part of the neural networks into multiple times of executions according to a preset ratio of output frame rates among the multiple neural networks; and
   executing the operator operation processes for the multiple neural networks sequentially by switching among the networks, such that the multiple neural networks output uniformly and satisfy the preset ratio of output frame rates;
   wherein, when the multiple neural networks comprise a first neural network and a second neural network, the one or more processors that have been configured to divide the operator operation process for at least one of the first neural network and the second neural network into multiple times of execution according to a preset ratio of output frame rates between the first neural network and the second neural network, a first preset number and a second preset number are set according to a number of operators in the first neural network, a number of operators in the second neural network and the preset ratio, and execute the operator operation processes of the multiple neural networks sequentially by switching among the networks are further configured to:

execute the operator operation process for the first neural network and complete operations for the first preset number of operators;

switch to execute the operator operation process for the second neural network and complete operations for the second preset number of operators; and execute the above two steps in a loop, such that the first neural network and the second neural network output uniformly.

6. The output apparatus of claim 5, wherein the one or more processors are further configured to:

analyze the first neural network and the second neural network to obtain description information of each operator in the first neural network and the second neural network;

assign an input and output memory to each operator respectively, and adding information about the input and output memory to the description information; and load pre-trained model data corresponding to each operator.

7. The output apparatus of claim 6, wherein, the description information at least comprises an input data address and an output data address, and the one or more processors are further configured to send the description information of the operator to an acceleration processing unit downstream, such that the acceleration processing unit executes the operator operation process according to the description information and the model data, wherein, during the execution of the operator operation process, output data stored in an output data address for an operator is to be taken as input data stored in an input data address for a next operator.

8. The output apparatus of claim 5, wherein, the neural network is an image processing neural network configured to implement autonomous driving.

9. A non-transitory computer readable storage medium having a computer program stored thereon, wherein, when the computer program is executed, the program implements an output method for multiple neural networks, comprising:

dividing an operator operation process for each of the neural networks or operator operation processes for part of the neural networks into multiple times of executions according to a preset ratio of output frame rates among the multiple neural networks; and executing the operator operation processes for the multiple neural networks sequentially by switching among the networks, such that the multiple neural networks output uniformly and satisfy the preset ratio of output frame rates;

wherein, when the multiple neural networks comprise a first neural network and a second neural network, the one or more processors that have been configured to divide the operator operation process for at least one of the first neural network and the second neural network into multiple times of execution according to a preset ratio of output frame rates between the first neural network and the second neural network, a first preset number and a second preset number are set according to a number of operators in the first neural network, a number of operators in the second neural network and the preset ratio, and execute the operator operation processes of the multiple neural networks sequentially by switching among the networks are further configured to:

execute the operator operation process for the first neural network and complete operations for the first preset number of operators;

switch to execute the operator operation process for the second neural network and complete operations for the second preset number of operators; and execute the above two steps in a loop, such that the first neural network and the second neural network output uniformly.

10. The non-transitory computer readable storage medium of claim 9, wherein the one or more processors are further configured to:

analyze the first neural network and the second neural network to obtain description information of each operator in the first neural network and the second neural network;

assign an input and output memory to each operator respectively, and adding information about the input and output memory to the description information; and load pre-trained model data corresponding to each operator.

11. The non-transitory computer readable storage medium of claim 10, wherein, the description information at least comprises an input data address and an output data address, and the one or more processors are further configured to send the description information of the operator to an acceleration processing unit downstream, such that the acceleration processing unit executes the operator operation process according to the description information and the model data, wherein, during the execution of the operator operation process, output data stored in an output data address for an operator is to be taken as input data stored in an input data address for a next operator.

12. The non-transitory computer readable storage medium of claim 9, wherein, the neural network is an image processing neural network configured to implement autonomous driving.

* * * * *